Jan. 8, 1929.
C. F. JEFFRIES
1,698,056
MOTOR VEHICLE CLUTCH AND BRAKE
Filed Aug. 10, 1927
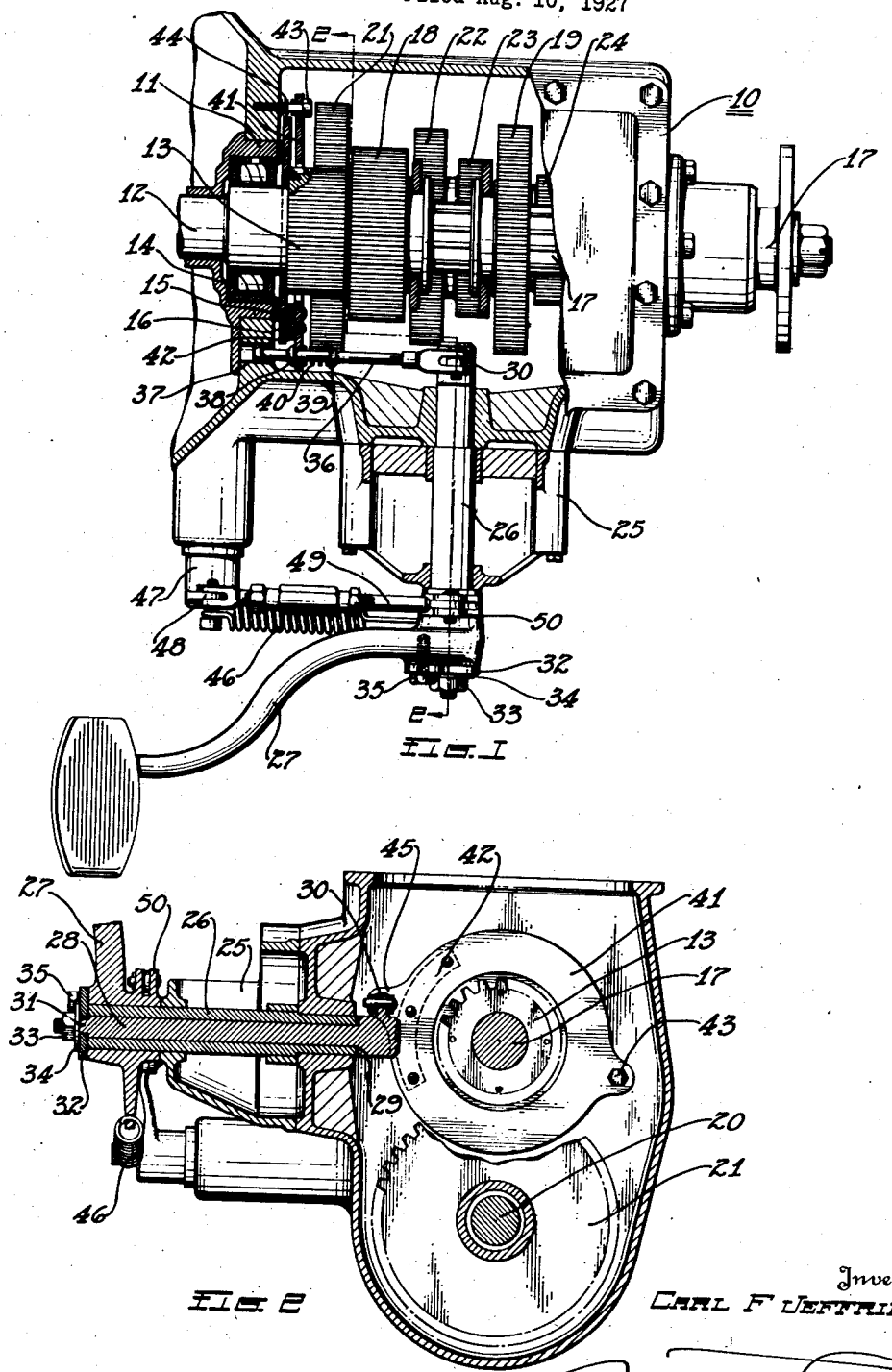
Inventor
CARL F JEFFRIES.
By
Attorney Patented Jan. 8, 1929.

1,698,056

UNITED STATES PATENT OFFICE.

CARL F. JEFFRIES, OF NASHVILLE, TENNESSEE, ASSIGNOR TO PACKARD MOTOR CAR COMPANY, OF DETROIT, MICHIGAN, A CORPORATION OF MICHIGAN.

MOTOR-VEHICLE CLUTCH AND BRAKE.

Application filed August 10, 1927. Serial No. 211,882.

This invention relates to motor vehicles and more particularly to brakes.

An object of the invention is to provide a transmission brake operated by the clutch lever.

Another object of the invention is to provide a brake associated with the main driving gear of the transmission and directly connected to and operated by the clutch lever.

Another object of the invention is to provide a brake associated with the driving gear of the transmission and arranged to be operated within the transmission casing by the clutch lever to which it is adjustably connected.

Another object of the invention is to provide a brake arranged within the transmission case completely submerged in the oil therein, whereby the possibility of overheating is avoided.

A still further object of the invention is to provide a brake which has a positive action, is highly efficient in operation and yet of marked simplicity as a whole and in respect to each of its component parts so that its manufacture is economically facilitated both as regards parts and their assembly.

Other objects of the invention will appear from the following description taken in connection with the drawings which form a part of this specification, and in which:

Figure 1 is a top plan view of a clutch case partly broken away and partly in section, illustrating the invention as applied; and Figure 2 is a sectional view taken on line 2—2 of Figure 1.

Referring by numerals to the drawings, 10 represents a transmission or gear case of a motor vehicle in the forward end of which is a bearing 11, having mounted therein a clutch shaft 12 formed with a main driving gear 13 upon one end thereof, the gear being positioned within the transmission or gear case. The bearing 11 is provided with a bushing 14 having a radial flange 15 which provides a thrust bearing for a disk 16 keyed to the gear 13. A driven shaft 17 mounted in and extending from the opposite end of the casing has its forward end mounted in a spigot bearing in the gear 13. Sliding gears, 18 and 19, are mounted on the shaft 17, the shaft being splined as shown so that the gears and shaft will turn together. A countershaft 20 in the gear casing has mounted thereon gears 21, 22, 23 and 24, the gear 21 being constantly in mesh with the gear 13 and the gear 22 being adapted to mesh with the gear 18, when the latter is shifted rearwardly in the second speed position. The gear 18 is formed with internal teeth, not shown, which are adapted to mesh with the gear 13 so as to form a clutch engagement therewith to provide a direct drive. The gear 19 is adapted to be shifted both ways from a neutral position to engage with the lower speed gear 23, or through an idler gear, not shown, with the reverse gear 24. The gears 18 and 19 are adapted to be shifted to the several speed positions by shifting means of any approved type.

A suitable bracket 25 is arranged on one side of the gear casing to support a hollow rock shaft 26 upon which is mounted a clutch pedal 27, the shaft extending through the wall of the casing. Mounted in and extending through the hollow rock shaft 26 is a shaft 28 having an enlarged shouldered portion 29 bearing against the end of the shaft 26 within the casing and provided with a radial arm 30. The other end of the shaft 28 has a square shouldered portion 31 which receives a disk 32, the disk bearing upon the end of the shaft 26 and the collar of the clutch pedal 27. This disk is secured upon the shouldered portion 31 by a nut 33 threaded upon the end of the shaft 28 with a washer 34 interposed and is provided with a set screw or bolt 35 whereby an angular adjustment may be effected between the shafts 26 and 28. This is principally for the adjustment of the shafts when the clutch throw is readjusted.

Pivotally and adjustably connected to the arm 30 is a brake operating rod 36, the forward end of which is slidably mounted in the wall of the casing. The adjustment of the rod 36 is the initial adjustment and will seldom be used thereafter. As shown, the end of the rod is formed substantially spherical in order to provide a line bearing in the aperture 37 whereby friction is greatly reduced. This brake rod is provided with spaced shoulders 38 and 39 between which is mounted a coil spring 40.

A brake plate or pressure applying member 41 carrying a suitable lining 42 and encircling the gear 13 is mounted on the wall of the casing by a bolt 43 wound upon which is a coil spring 44 between the wall of the casing and the plate adapted to support the plate adjacent to the disk connected to the gear 13. The plate 41 has an ear 45 which is slotted to receive the rod 36. As shown, the plate engages the rod between the shoulder 39 and the coil spring 40, so that when the clutch pedal 27 is actuated to rock the shaft 28, the brake rod 36 pivoted to the shaft 28 will move the brake plate forwardly and force the lining thereof against the face of the disk 16, thus effectively applying the brake, which upon release is returned to its normal position through means of a coil spring 46 connected between a downwardly projecting arm carried by the clutch lever and a stud bolt in the end of a rock shaft 47. The rock shaft 47 operates the clutch, not shown, and is provided with a radial arm 48 connected by an adjustable rod 49 to a clevis 50 upon the collar of the clutch pedal 27, whereby the actuation of the clutch pedal causes a concomitant action between the shafts 28 and 47 to apply the brake simultaneously with the operation of the clutch.

Although this invention has been described in connection with certain specific embodiments, the principles involved are susceptible of numerous other applications that will readily occur to persons skilled in the art. The invention is therefore to be limited only as indicated by the scope of the appended claims.

Having thus described the various features of my invention, what I claim as new and desire to secure by Letters of Patent is:

1. In a brake mechanism for transmissions having a main driving gear operatively connected with a driven shaft and an operating lever for the transmission, a disk carried by the driving gear, a brake plate associated with the disk and means for operatively connecting said brake plate with the operating lever.

2. In a brake mechanism for transmissions having a main driving gear operatively connected with a driven shaft and an operating lever for the transmission, a disk carried by the driving gear, a brake plate associated with the disk and a cushioned connection between the brake plate and the operating lever.

3. In a brake mechanism for transmissions having a gear casing with a main driving gear positioned therein and operatively connected with a driven shaft and an operating lever for the transmission, a friction disk carried by the gear, a pressure applying brake plate associated with the friction disk and a linkage between the brake plate and the operating lever.

4. In a brake mechanism for transmissions having a gear casing with a main driving gear positioned therein and operatively connected with a driven shaft and an operating lever for the transmission, a friction disk carried by the gear, a pressure applying brake plate encircling the gear and adapted to engage the frictional disk, and a brake rod adjustably connecting the brake plate to the operating lever.

5. In a brake mechanism for transmissions having a gear casing with a clutch shaft mounted in the forward end thereof and provided with a main driving gear positioned within the casing and operatively connected with a driven shaft and an operating lever for the transmission, a bearing for the clutch shaft having a bushing formed with a thrust bearing, a disk carried by the gear engaging the thrust bearing, a brake plate associated with the disk and means for operatively connecting said brake plate with the operating lever.

6. In a brake mechanism adapted to be associated with a transmission for a motor vehicle having a clutch shaft with a main driving gear thereon operatively connected with a driven shaft and an operating lever for the transmission, a bearing for the clutch shaft having a bushing, a thrust bearing formed integral with the bushing, a disk secured to the gear and engaging the thrust bearing, a pressure applying brake plate encircling the gear and adapted to engage the disk, means for supporting the brake plate and means for operatively connecting said brake plate with the operating lever.

7. In a brake mechanism adapted to be associated with a transmission for a motor vehicle having a casing with a clutch shaft mounted in the forward end thereof carrying a main driving gear positioned in the casing and operatively connected with a driven shaft and an operating lever for the transmission, a brake mechanism associated with said gear, a brake rod slidably mounted in the forward end of said casing, said brake rod supporting and operating said brake and means for adjustably connecting the rod to the operating lever.

8. In a motor vehicle, the combination with a transmission having a gear casing with a clutch shaft mounted in the forward end thereof, a main driving gear on the clutch shaft operatively connected with a driven shaft and an operating lever for the transmission, of a brake mechanism associated with the driving gear, a brake rod having a line bearing in the forward end of the gear casing, means for connecting the rod to the brake and means for adjustably connecting the rod to the operating lever.

9. In a motor vehicle, the combination with a transmission having a gear case with a clutch shaft mounted in the forward end thereof, a driving gear on the clutch shaft operatively connected with a driven shaft and an operating lever for the transmission, of a brake mechanism associated with the driving gear, a brake rod slidably mounted in the forward end of the casing, a cushioned connection between the brake rod and the brake, and means for adjustably connecting the rod to the operating lever.

10. In a motor vehicle, the combination with a transmission having a main driving gear operatively connected with a driven shaft, of a brake mechanism associated with the gear, an operating means for the transmission comprising a hollow shaft, a lever mounted upon the hollow shaft, a shaft mounted in and extending through the hollow shaft, means for making an angular adjustment between the shafts and means for operatively connecting one of the shafts to the braking mechanism.

11. In a motor vehicle, the combination with a transmission having a main driving gear operatively connected with a driven shaft, of a brake mechanism associated with the gear, and operating means for the transmission comprising telescoping shafts, means for effecting an angular adjustment between the shafts, an operating lever upon the outer shaft and a rod connecting the inner shaft to the braking mechanism.

In testimony whereof I affix my signature.

CARL F. JEFFRIES.